Figure 1:
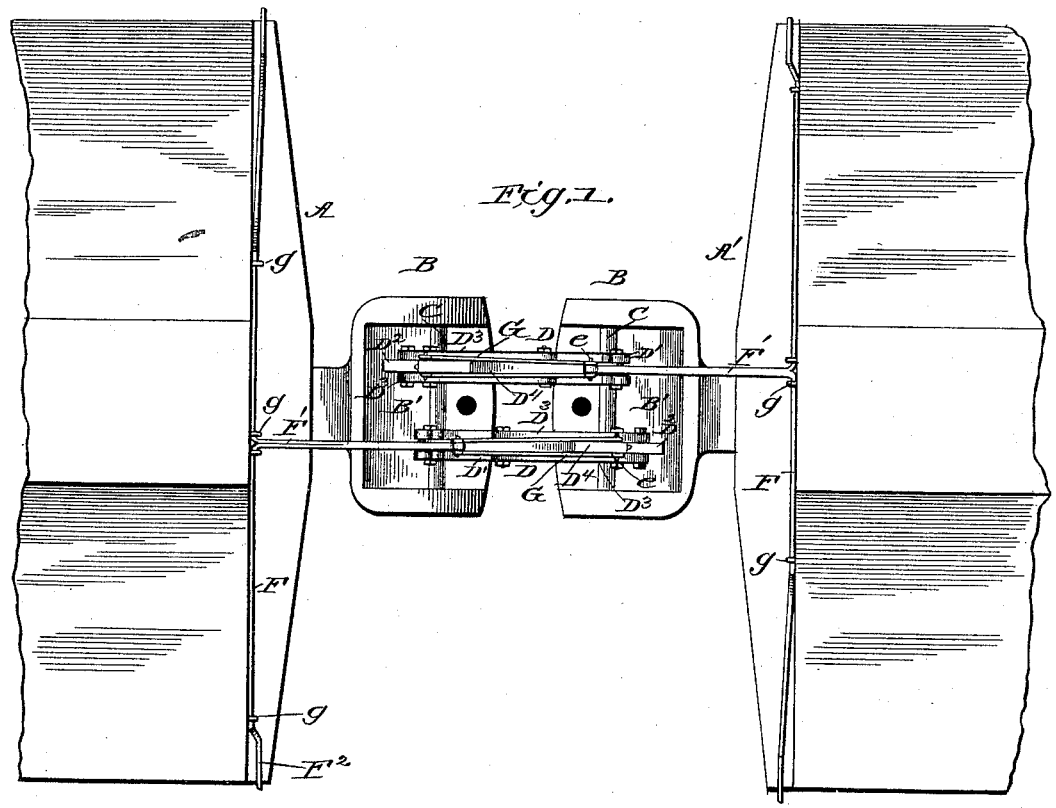
Figure 2:
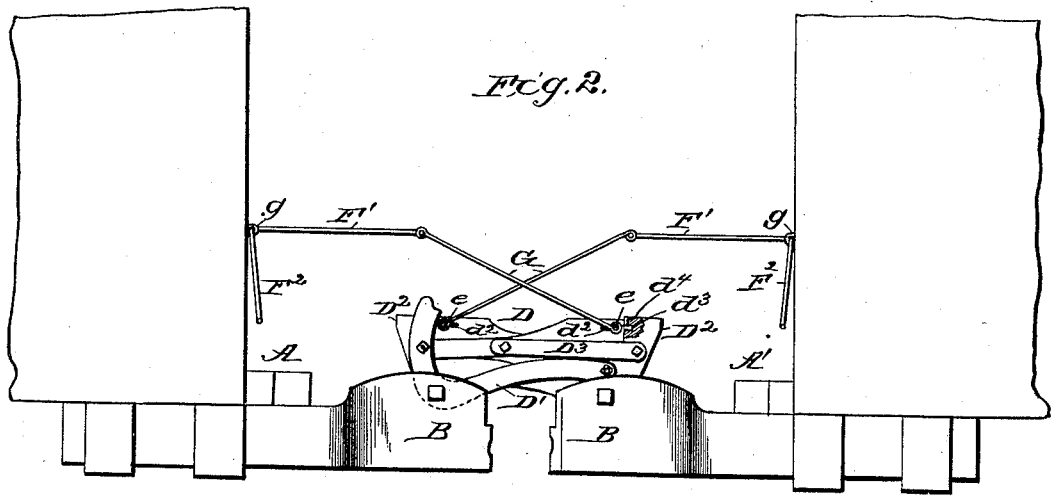

(No Model.) 2 Sheets—Sheet 1.

J. POFFENBARGER.
CAR COUPLING.

No. 401,854. Patented Apr. 23, 1889.

WITNESSES:
Fred G. Dieterich,
Jos. A. Ryan

INVENTOR:
Josias Poffenbarger
BY Munn
ATTORNEYS.

(No Model.) 2 Sheets—Sheet 2.
J. POFFENBARGER.
CAR COUPLING.
No. 401,854. Patented Apr. 23, 1889.
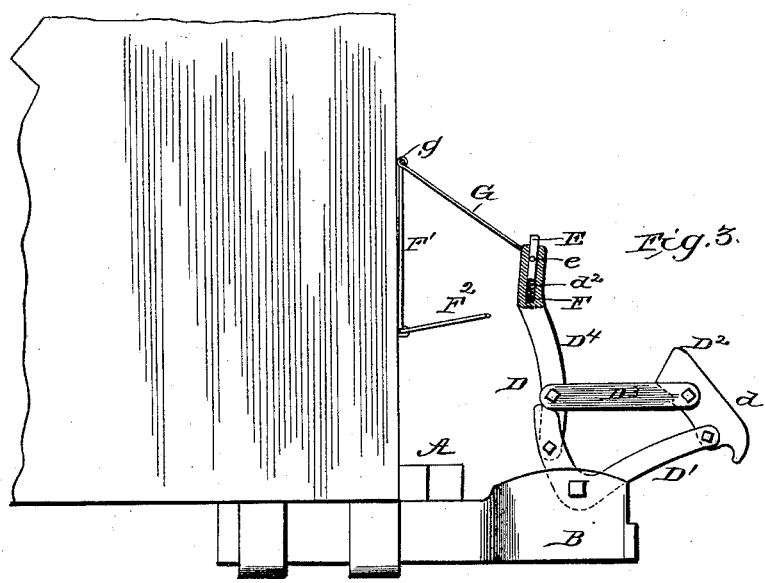
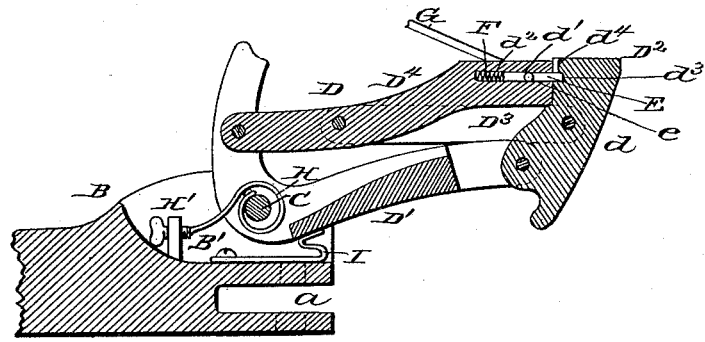
WITNESSES:
Fred G. Dieterich
Jos. A. Ryan
INVENTOR:
Josias Poffenbarger.
BY Mann & Co.
ATTORNEYS.